(12) United States Patent
Muto et al.

(10) Patent No.: US 12,090,560 B2
(45) Date of Patent: Sep. 17, 2024

(54) DEBURRING APPARATUS AND DEBURRING METHOD

(71) Applicant: SUGINO MACHINE LIMITED, Uozu (JP)

(72) Inventors: Mitsuru Muto, Uozu (JP); Tomoaki Hori, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 784 days.

(21) Appl. No.: 17/182,327

(22) Filed: Feb. 23, 2021

(65) Prior Publication Data

US 2022/0126374 A1 Apr. 28, 2022

Related U.S. Application Data

(60) Provisional application No. 63/105,990, filed on Oct. 27, 2020.

(51) Int. Cl.
*B23B 51/10* (2006.01)
*B23B 31/08* (2006.01)

(52) U.S. Cl.
CPC ............ *B23B 51/101* (2013.01); *B23B 31/08* (2013.01); *B23B 2220/08* (2013.01); *Y10T 408/665* (2015.01)

(58) Field of Classification Search
CPC ... B23B 31/08; B23B 51/101; B23B 2220/08; Y10T 408/665
See application file for complete search history.

(56) References Cited

U.S. PATENT DOCUMENTS

| | | | | |
|---|---|---|---|---|
| 2,549,972 A * | 4/1951 | Jones | ........................ | B23G 1/46 |
| | | | | 408/139 |
| 2,820,378 A * | 1/1958 | Randles | .................. | B23B 31/08 |
| | | | | 408/127 |
| 4,984,942 A * | 1/1991 | Holtz | ...................... | B23B 31/08 |
| | | | | 408/127 |
| 7,717,653 B2 * | 5/2010 | Miyata | ..................... | B23Q 3/12 |
| | | | | 408/127 |

FOREIGN PATENT DOCUMENTS

| | | | |
|---|---|---|---|
| DE | 102005038902 A1 * | 2/2007 | ............. B23B 31/08 |
| JP | 2009214234 A | 9/2009 | |
| JP | 4665440 B2 | 1/2011 | |

* cited by examiner

*Primary Examiner* — Eric A. Gates
(74) *Attorney, Agent, or Firm* — Locke Lord LLP; Tim Tingkang Xia, Esq.

(57) ABSTRACT

The present disclosure provides a deburring apparatus and a deburring method that does not require a positioning engagement part that is engaged with a fixed part of a machine tool. The deburring apparatus (10) includes a housing (1) with a shank (11), a transmission rod (3), a recovery rod (5), a tilting shaft (4), a spring (6), a holder (7), and a rotary-to-rectilinear motion conversion mechanism (9) with a plunger (8). The spring forces the recovery rod toward the tilting shaft. The holder for fixing the cutter (101) is arranged on the tilting shaft in a manner rotatable through a predetermined rotation angle. The rotary-to-rectilinear motion conversion mechanism separates the first flange portion from the second flange portion and brings the plunger into contact with the recovery rod on the tilting axis (43) when the holder rotates in a direction opposite to the rotation direction of the shank (11).

12 Claims, 12 Drawing Sheets

DEBURRING APPARATUS AND DEBURRING METHOD

CROSS REFERENCE TO RELATED APPLICATION

This application claims priority to and the benefit of U.S. Provisional Patent Application No. 63/105,990, filed on Oct. 27, 2020, which is incorporated herein by reference in its entirety.

TECHNICAL FIELD

The present disclosure relates to a deburring apparatus and a deburring method.

BACKGROUND

A conventional deburring device includes a shank, a device-holding part, and a support member. The shank is installed on a spindle of a machine tool, and the device holding part rotates integrally with the shank. The support member supports the device-holding part in a manner tiltable relative to the shank, and includes a tilting forcing member that forces the device-holding part toward the shank. However, the deburring device may vibrate when deburring.

SUMMARY

Problem to be Solved by the Invention

The present disclosure provides a deburring apparatus which is not prone to vibration and a deburring method in which the apparatus is not prone to vibration.

Means for Solving the Problem

The present disclosure provides a deburring apparatus, including: a housing, a recovery rod, a tilting shaft, an elastic member, a holder, a rotary-to-rectilinear motion conversion mechanism, and a rotation transmission mechanism.

The housing includes a shank, a seat surface, and a mechanism chamber arranged along a shank-axis.

The recovery rod includes a first flange portion, and is reciprocable along the shank-axis.

The tilting shaft includes a second flange portion opposite to the first flange portion, and a spherical bush supported on the seat surface and having a tilting center on the shank-axis. Furthermore, the tilting shaft is arranged along a tilting axis passing through a tilting center, and is tiltable around the tilting center.

The elastic member forces the recovery rod toward the tilting shaft.

The holder is arranged on the tilting shaft in a manner rotatable through a predetermined rotation angle relative to the tilting shaft, and fixes a cutter.

The rotary-to-rectilinear motion conversion mechanism includes a plunger movable along the tilting axis on the holder. Furthermore, the rotary-to-rectilinear motion conversion mechanism separates the first flange portion from the second flange portion and brings the plunger into contact with the recovery rod on the tilting axis when the holder rotates in a direction opposite to a rotation direction of the shank.

The rotation transmission mechanism transmits a rotation of the housing to the tilting shaft.

The present disclosure further provides a deburring method, including: transmitting a rotation of a housing to a tilting shaft by a rotation transmission mechanism; forcing, in a time of non-processing, a second flange portion of the tilting shaft by a first flange portion of a recovery rod; and in a time of processing, rotating a holder holding a cutter relative to the tilting shaft in a direction opposite to a rotation direction of the cutter by a cutting resistance from a workpiece, converting a rotation of the holder to move the plunger toward the recovery rod by a rotary-to-rectilinear motion conversion mechanism, pushing the recovery rod upward by the plunger and bringing the plunger into contact with the recovery rod on the tilting axis, thus separating the first flange portion from the second flange portion, and cutting the workpiece by the cutter rotating integrally with the tilting shaft.

The deburring apparatus is installed on machining centers, turning centers, and other machine tools, and used as rotating tools. The shank of the deburring apparatus is installed on a spindle of the machine tool, and the entire deburring apparatus rotates together with the spindle of the machine tool.

For ease of description, the side where the cutter is mounted is referred to as the distal end side, and the side where the shank is arranged is referred to as the proximal end side.

The recovery rod, the spherical bush, the seat surface, the holder, the plunger, and the cutter are arranged on the shank-axis which is the central axis of the shank.

The guide holes and the transmission rods are arranged in the same number on the cylindrical surface centered on the shank-axis and evenly distributed on the circumference.

The receiving portions may be distributed evenly and circumferentially on the cylindrical surface centered on the tilting axis and have the same number as the transmission rods. The receiving portion may have an abutting surface on a plane passing through the shank-axis.

When the cutter is in contact with the workpiece, the cutter is subjected to a cutting resistance. The holder holding the cutter is rotated relative to the tilting shaft in a direction opposite to a rotation direction of the deburring apparatus by the cutting resistance received by the cutter from the workpiece. The amount of rotation is determined according to the configuration of the rotary-to-rectilinear motion conversion mechanism.

In addition, the cutter may include a brush.

The rotary-to-rectilinear motion conversion mechanism includes a plunger. The plunger moves along the tilting axis which is the central axis of the tilting shaft. As the holder rotates in a direction opposite to the rotation direction, the rotary-to-rectilinear motion conversion mechanism pushes the plunger upward toward the proximal end direction. The plunger reciprocates with a stroke determined structurally relative to the predetermined rotation angle of the holder.

When the holder rotates in a direction opposite to the rotation direction of the deburring apparatus, the plunger overcomes the force of the elastic member and pushes the recovery rod upward toward the proximal end side. The plunger pushes up the recovery rod to separate the first flange portion and the second flange portion. The top of the plunger abuts against the recovery rod on the tilting axis, and the tilting shaft can tilt freely.

When the holder is rotated to the end in the direction opposite to the rotation direction of the deburring apparatus, the top of the plunger is in contact with the recovery rod near the tilting center.

The rotary-to-rectilinear motion conversion mechanism is, for example, a cylindrical groove cam mechanism. The cylindrical groove cam mechanism includes a cam pin and a plunger. The plunger includes a cam groove and is reciprocally movable and non-rotatably arranged inside the holder. The plunger moves along the tilting axis. The top of the plunger is located on the tilting axis. The cam pin extends perpendicularly to the tilting axis and is fixed to the tilting shaft. The cam groove preferably penetrates through the plunger. The cam groove includes an opening that draws a spiral on the cylindrical surface of the plunger.

The cam pin slides in the cam groove.

The holder includes a rotation hole that expands in a fan shape around the tilting axis on a plane perpendicular to the tilting axis. The cam pin penetrates through the rotation hole. The center angle of the rotation hole is equal to or greater than the rotation angle of the cam groove.

As the holder rotates in the rotation direction of the deburring apparatus relative to the tilting shaft, the plunger moves toward the distal end direction. When the plunger is located at the distal end in the distal end direction, the first flange portion abuts against the second flange portion. Preferably, at this time, the top of the plunger abuts against the recovery rod.

When the cutter is not in contact with the workpiece, the recovery rod pushes down the plunger by the force of the spring. When the plunger is pushed down, the rotary-to-rectilinear motion conversion mechanism rotates the holder relative to the tilting shaft in the rotation direction of the deburring apparatus. As a result, the holder and the plunger return to the initial position. Then, the first flange portion is in contact with the second flange portion. At this time, the tilting shaft cannot be tilted.

The rotation transmission mechanism may include a rolling groove, a rolling body holding portion, and a rolling body. The rolling grooves, the rolling body holding portions, and the rolling bodies are respectively arranged in the same number and are evenly arranged on the circumference. The rolling groove is arranged in the mechanism chamber along an arc that intersects a spherical surface centered at the tilting center and a plane passing through the shank-axis. The rolling groove is round. The rolling body is a ball. The rolling body holding portion is a round hole having a bottom, and is arranged on the outer surface of the second flange portion. The ball as the rolling body is arranged between the rolling body holding portion and the rolling groove to roll. The rolling body is sandwiched between the rolling body holding portion and the rolling groove, and cannot relatively rotate relative to the second flange portion surrounding the tilting axis. Therefore, the rotation of the housing is transmitted to the tilting shaft via the rolling body, the rolling groove, and the rolling body holding portion.

In addition, the rolling body holding portion may be arranged on the inner cylindrical surface of the mechanism chamber, and the rolling groove may be arranged on the outer peripheral portion of the second flange portion.

In addition, the rolling body holding portion may be arranged on the spherical bush, and the rolling groove may be arranged on the seat surface. In addition, the rolling body holding portion may be arranged on the seat surface, and the rolling groove may be arranged on the spherical bush.

In addition, the first flange portion and the rotary-to-rectilinear motion conversion mechanism may be omitted. In this case, a tilt recovery mechanism may be provided. The tilt recovery mechanism is, for example, a compression spring that is evenly arranged on the circumference between the proximal end part side of the outer peripheral portion of the second flange portion and the mechanism chamber.

Effects of the Invention

According to the present disclosure, it is possible to provide a deburring apparatus which is not prone to vibration and a deburring method in which the apparatus is not prone to vibration.

DESCRIPTION OF THE REFERENCE NUMERALS

Figure 1:
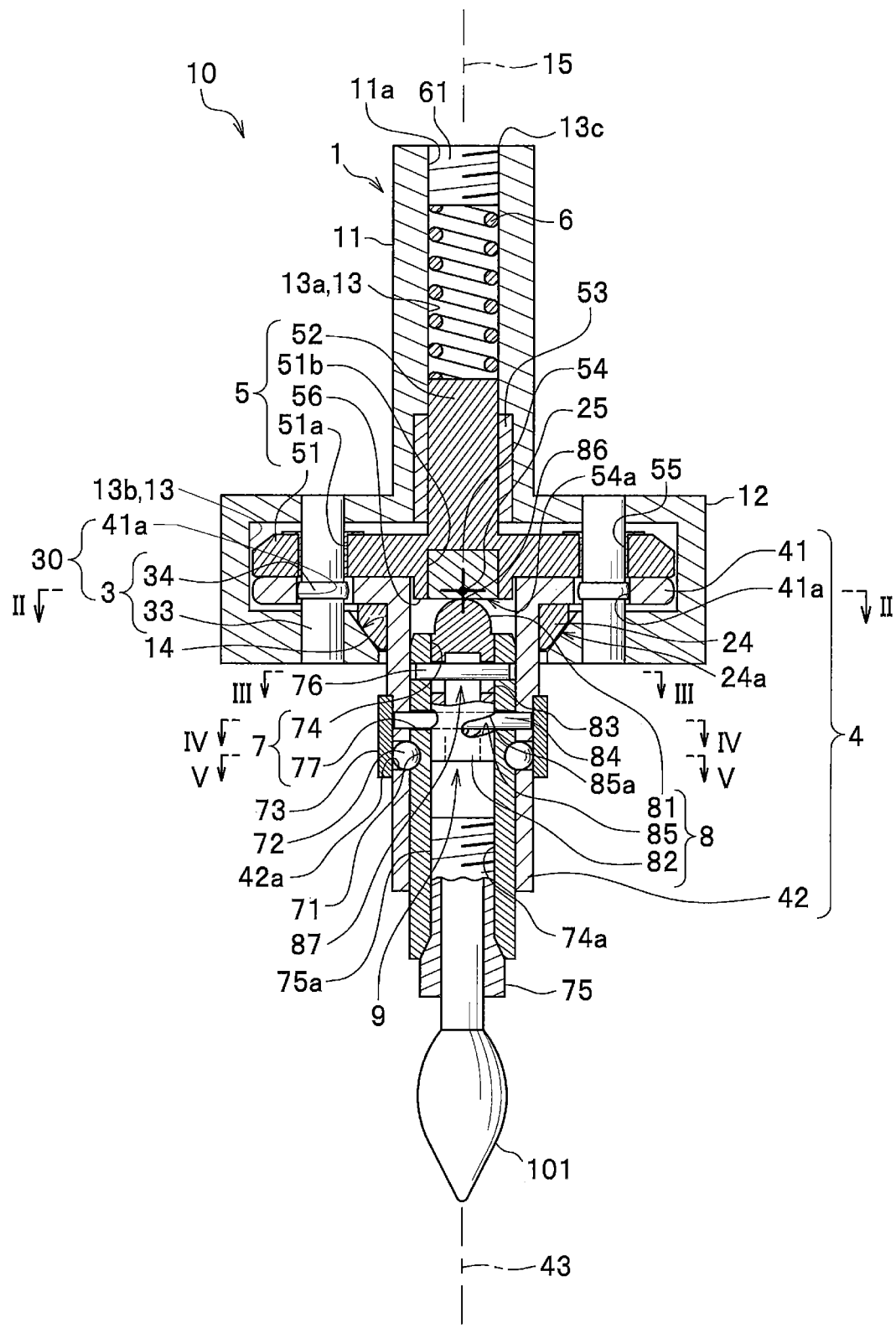
FIG. 1 shows a longitudinal cross-sectional view of a deburring apparatus during non-processing according to Embodiment 1 of the present disclosure.

1 Housing
11 Shank
13 Mechanism chamber
14 Seat surface
15 Shank-axis
24 Spherical bush
25 Tilting center
3 Transmission rod
34 Bulge portion
4 Tilting shaft
41 Second flange portion
41a Receiving portion
41b Abutting surface
43 Tilting axis
5 Recovery rod
51 First flange portion
51a Guide hole 6 Spring (elastic member)
61 Adjustment screw
7 Holder
71 Annular groove
72 Ball
76 Anti-rotation pin (anti-rotation mechanism)
8 Plunger
81 Top portion
83 Long hole (anti-rotation mechanism)
84 Cam pin (rotary-to-rectilinear motion conversion mechanism)
85 Cam groove (rotary-to-rectilinear motion conversion mechanism)
87 Anti-rotation mechanism
9 Rotary-to-rectilinear motion conversion mechanism
10, 100, 200 Deburring apparatuses
101 Cutter

DETAILED DESCRIPTION OF THE PREFERRED EMBODIMENTS

Embodiment 1

Referring to FIG. 1, the deburring apparatus 10 of this embodiment includes a housing 1 with a shank 11, a tilting shaft 4, a recovery rod 5, a spring 6, a holder 7, a spherical bush 24, and a rotary-to-rectilinear motion conversion mechanism 9. The rotary-to-rectilinear motion conversion mechanism 9 includes a plunger 8, a cam groove 85, a cam pin 84, and an anti-rotation mechanism 87. The rotation transmission mechanism 30 includes a set of transmission rods 3 and a receiving portion 41a. The deburring apparatus 10 may have guide holes 51a.

The shank 11 of the deburring apparatus 10 may be attached to a spindle (not shown) of a machine tool which may serve as, for example, a machining center. The entire deburring apparatus 10 may rotate integrally with a cutter 101 for use.

Hereinafter, for convenience of description, a direction along a shank-axis 15 or a tilting axis 43 may be referred to as a vertical direction.

The housing 1 includes a body 12, a mechanism chamber 13, and a seat surface 14. The housing 1 may include an adjustment screw 61. The shank 11 may be, for example, a straight shank. The shank 11 extends along the shank-axis 15.

The body 12 is disposed on a distal end side of the shank 11. The body 12 has a cylindrical shape centered on the shank-axis 15.

The mechanism chamber 13 is a stepped cylinder with the shank-axis 15 as a center and is expanded inside the shank 11 and the body 12. The mechanism chamber 13 includes a small-diameter part 13a arranged at a proximal end part and a large-diameter part 13b arranged at a distal end part. A bush 53 may be arranged at the small diameter part 13a. The small-diameter part 13a may have an opening 13c at the proximal end side of the shank 11. A female thread 11a is arranged in the opening 13c. The adjustment screw 61 is screwed into the female thread 11a.

The seat surface 14 is an inner surface arranged at the distal end part of the mechanism chamber 13, and has a right circular conical surface shape and decreases in diameter toward the distal end side. In addition, the seat surface 14 may be a concave spherical surface.

The spherical bush 24 has a spherical surface 24a as a convex surface. The center of the spherical surface 24a is a tilting center 25. The spherical surface 24a is inscribed with the seat surface 14. The spherical bush 24 slides on the seat surface 14.

The transmission rod 3 includes a shaft portion 33 and a bulge portion 34. The transmission rod 3 is arranged in parallel with the shank-axis 15 inside the mechanism chamber 13. A plurality of transmission rods 3 is arranged on the circumference of a straight cylindrical surface 16 (referring to FIG. 2) centered on the shank-axis 15. The transmission rods 3 may be arranged at equal intervals on the circumference. For example, 5 to 7 transmission rods 3 are arranged. The transmission rod 3 is fixed to the housing 1. The transmission rod 3 penetrates through the guide hole 51a and the receiving portion 41a.

The outer surface of the bulge portion 34 is a convex spherical surface. The center of the bulge portion 34 is arranged on a plane perpendicular to the shank-axis 15 and passing through the tilting center 25 of the tilting shaft 4. The bulge portion 34 is arranged in the receiving portion 41a with a certain amount of play.

The recovery rod 5 includes a stem 52, a first flange portion 51, and a guide hole 51a. The first flange portion 51 is a circular plate centered on the shank-axis 15. The recovery rod 5 may further include a convex portion 56, a contact portion 54, and a bush 55. The convex portion 56 has a cylindrical shape and is arranged at the distal end part of the first flange portion 51. A recess 51b is arranged on the shank-axis 15 at the distal end part of the convex portion 56. The contact portion 54 is attached to the recess 51b. The distal end surface 54a of the contact portion 54 is a plane perpendicular to the shank-axis 15. The distal end surface 54a may protrude toward the distal end side or be recessed toward the proximal end side compared to the outer peripheral portion of the first flange portion 51, or the distal end surface 54a may be on the same surface as the outer peripheral portion of the first flange portion 51.

The stem 52 has a cylindrical shape and is arranged in the small diameter part 13a. The stem 52 is slidably supported by the small diameter part 13a or the bush 53.

The number of the guide holes 51a is the same as that of the transmission rods 3. The guide hole 51a is a cylindrical hole and is arranged in the first flange portion 51. The guide hole 51a extends parallel to the shank-axis 15 and is arranged on the circumference of the straight cylindrical surface 16. The bush 55 is arranged at the inner diameter of the guide hole 51a.

The transmission rod 3 penetrates through the guide hole 51a. The shaft portion 33 slides in the guide hole 51a or the bush 55.

The recovery rod 5 may reciprocate in the vertical direction in a manner that the stem 52 is guided by the small diameter part 13a and the guide hole 51a is guided by the shaft portion 33.

The spring 6 is, for example, a coil spring or a disc spring. The spring 6 forces the recovery rod 5 toward the distal end direction. The spring 6 is supported by the recovery rod 5 and the adjustment screw 61. The adjustment screw 61 adjusts the initial length of the spring 6.

The tilting shaft 4 includes a rod portion 42, a second flange portion 41, and a set of receiving portions 41a. The tilting shaft 4 extends along the tilting axis 43. The tilting axis 43 passes through the tilting center 25. The tilting shaft 4 is supported on the seat surface 14 via a spherical bush 24.

The rod portion 42 has a hollow cylindrical shape. The rod portion 42 is arranged on the distal end side of the second flange portion 41 and extends below the housing 1. The second flange portion 41 is a circular plate centered on the tilting axis 43.

The receiving portion 41a is arranged in the second flange portion 41.

Figure 2:
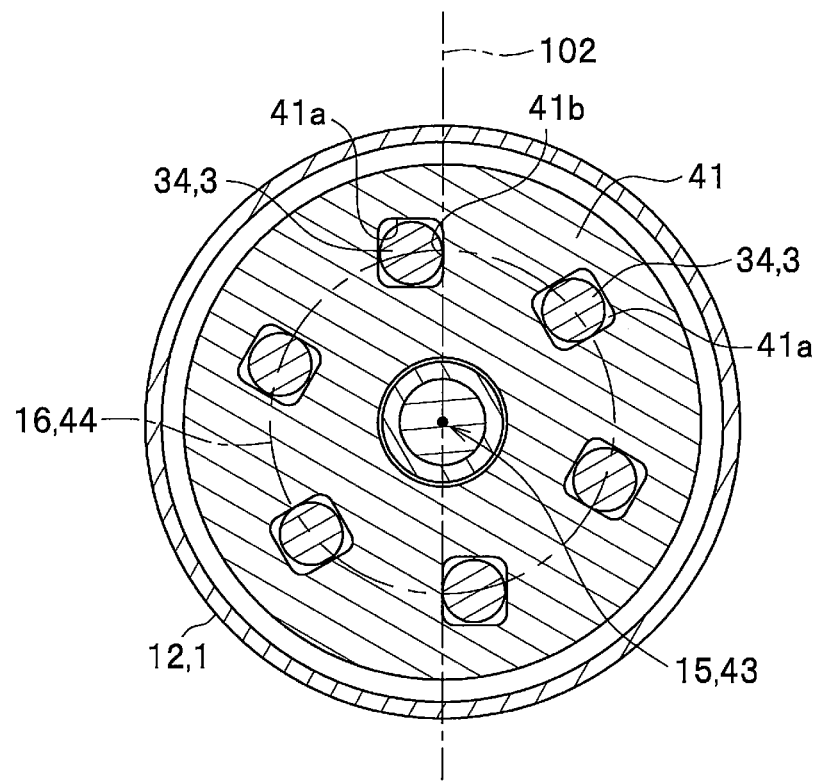
FIG. 2 shows a cross-sectional view taken along line II-II in FIG. 1.

The receiving portion 41a is a hole that penetrates through the second flange portion 41 in the vertical direction. As shown in FIG. 2, the receiving portion 41a is evenly arranged on a straight cylindrical surface 44 centered on the tilting axis 43. The diameter of the straight cylindrical surface 44 is the same as the diameter of the straight cylindrical surface 16. The number of the receiving portions 41a is the same as that of the transmission rods 3. The receiving portion 41a includes an abutting surface 41b. The abutting surface 41b is a wall surface of the receiving portion 41a on the rotation direction side of the cutter 101. The abutting surface 41b constitutes a part of a plane (for example, the plane 102) including the tilting axis 43. The abutting surface 41b is arranged corresponding to the position of the transmission rod 3. For example, when the transmission rods 3 are evenly arranged on the circumference, the abutting surfaces 41b are also evenly arranged on the circumference. Viewed from the axial direction of the tilting axis 43, the receiving portion 41a has a shape of, for example, rectangular. The receiving portion 41a has a size such that the transmission rod 3 is only in contact with the abutting surface 41b when the tilting shaft 4 is tilted.

Figure 4:
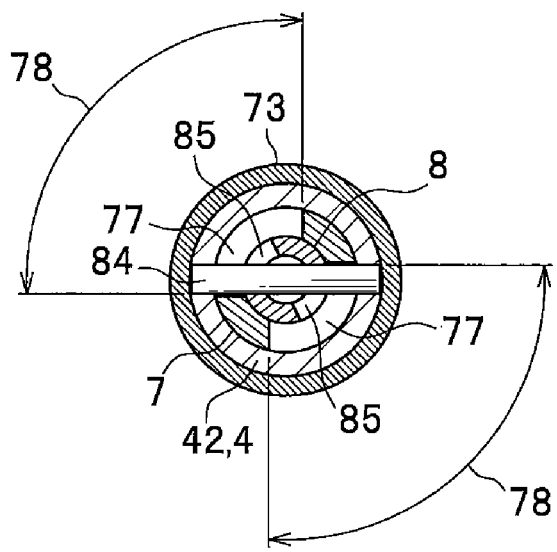
FIG. 4 shows a cross-sectional view taken along line IV-IV in FIG. 1.
Figure 5:
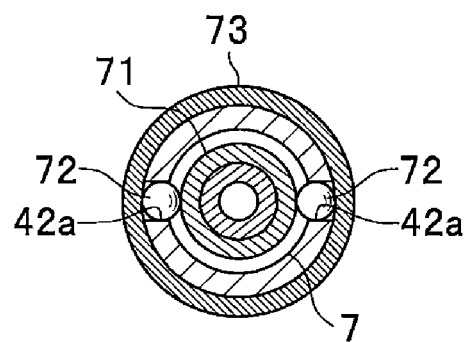
FIG. 5 shows a cross-sectional view taken along line V-V in FIG. 1.

As shown in FIGS. 1 and 5, the holder 7 is arranged on the radially inner side of the rod 42. The holder 7 is supported in a manner that the movement of the holder 7 toward the axial direction of the tilting axis 43 is suppressed and the holder 7 can be rotated around the tilting axis 43 only through a rotation angle 78 (referring to FIG. 4).

The deburring apparatus 10 may include a ball holding hole 42a, an annular groove 71, and a ball 72.

The ball holding hole 42a is arranged in the rod 42. A plurality of ball holding holes 42a (two in FIG. 5) extend along the radial direction and are arranged at equal intervals on the circumference.

The annular groove 71 has a substantially semicircular longitudinal section and extends along the circumferential direction of the holder 7. The annular groove 71 may be arranged over the entire circumference.

The ball 72 is held between the ball holding hole 42a and the annular groove 71 and rolls in the annular groove 71.

In addition, the ball holding hole 42a may extend along the radial direction and penetrate through the rod 42. In this case, a holding cylinder 73 is arranged on the radially outer side of the ball holding hole 42a. The holding cylinder 73 has a hollow cylindrical shape, and is arranged outside the ball holding hole 42a. The ball 72 is held by the holding cylinder 73.

As shown in FIGS. 1 and 4, the holder 7 includes a holding hole 74 and a rotation hole 77, and has a hollow cylindrical shape.

The holding hole 74 is a cylindrical hole extending along the tilting axis 43. The holding hole 74 penetrates through the holder 7.

The rotation hole 77 extends along a plane perpendicular to the tilting axis 43. Referring to FIG. 4, the rotation hole 77 is expanded in a fan shape with the tilting axis 43 as the center. The center angle at which the rotation hole 77 expands is the rotation angle 78.

The vertical width of the rotation hole 77 is larger than the diameter of the cam pin 84. The rotation angle 78 is greater than or equal to a rotation angle φ.

The holder 7 may have a collet 75. The collet 75 is attached to the distal end part of the holding hole 74. The collet 75 holds the cutter 101. For example, the holding hole 74 has a female thread 74a, and the collet 75 has a male thread 75a on its outer periphery. The collet 75 is screw-fastened by the female thread 74a.

Figure 6:
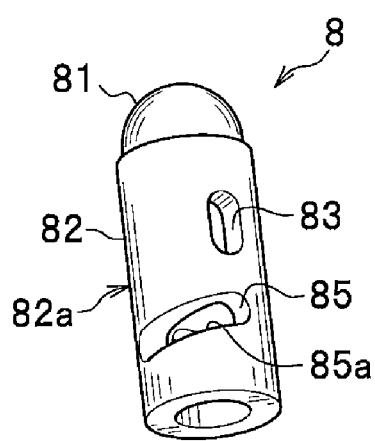
FIG. 6 shows a perspective view of a plunger according to Embodiment 1 of the present disclosure.

As shown in FIG. 6, the plunger 8 has a cannonball shape and includes a cylindrical portion 82, a top portion 81 and a cam groove 85. The plunger 8 is arranged inside the holding hole 74.

The cylindrical portion 82 is a cylinder centered on the tilting axis 43. The cylindrical portion 82 may be hollow. The cylindrical portion 82 may slide in the holding hole 74.

The top portion 81 is arranged protrudingly on the proximal end side of the cylindrical portion 82. The top portion 81 has a hemispherical shape. The top portion 81 abuts against the contact portion 54. The center of the top portion 81 is arranged on the tilting axis 43.

Figure 7:
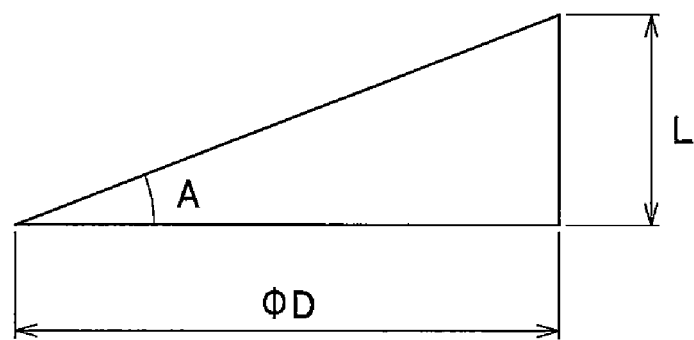
FIG. 7 shows a description view of a movement stroke of the plunger.

The cam groove 85 is a spiral groove. The cam groove 85 penetrates through the plunger 8 in a direction orthogonal to the tilting axis 43. The cam groove 85 has an opening 85a on the cylindrical surface 82a of the cylindrical portion 82. The opening 85a is configured to draw a spiral along the cylindrical surface 82a. The opening 85a tends to the distal end direction as it rotates along the rotation direction of the cutter 101. For example, when viewed from the proximal end direction, the opening 85a is a spiral that rises to the right when the cutter 101 is rotated clockwise. As shown in FIG. 7, the cam groove 85 satisfies the following formula.

$$L = \varphi D \tan A$$

In the above formula, A represents a lead angle of the spiral groove, φ represents the rotation angle (rad), D represents a diameter of the plunger (the part of the cam groove), and L represents a movement stroke of the plunger.

For example, the lead angle A ranges from 15° to 20°, and the rotation angle φ ranges from 60° to 120°. The width of the cam groove 85 is substantially equal to the diameter of the cam pin 84.

When the plunger 8 is located at the end in the proximal end direction, the vertex 86 of the top portion 81 is located near the tilting center 25.

The anti-rotation mechanism 87 restricts the rotation of the plunger 8 relative to the holder 7. The anti-rotation mechanism 87 includes, for example, a holding hole 79, a long hole 83, and an anti-rotation pin 76.

Figure 3:
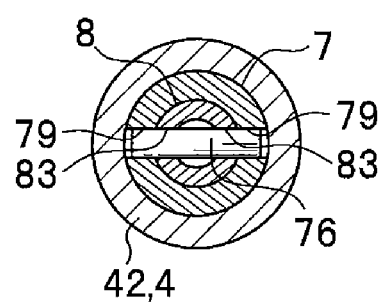
FIG. 3 shows a cross-sectional view taken along line III-III in FIG. 1.

As shown in FIGS. 1 and 3, the holding hole 79 is arranged in the holder 7. The holding hole 79 extends orthogonally to the tilting axis 43 and penetrates through the holder 7. The inner diameter of the holding hole 79 is substantially the same as the diameter of the anti-rotation pin 76.

The long hole 83 is arranged in the plunger 8. The long hole 83 penetrates through the cylindrical portion 82 in a direction orthogonal to the tilting axis 43. The long hole 83 extends along the tilting axis 43. The length of the long hole 83 in the vertical direction is substantially the same as the movement stroke L of the plunger 8.

The anti-rotation pin 76 is supported by the holding hole 79. The anti-rotation pin 76 is arranged in the holder 7 to extend along the radial direction of the holder 7. The anti-rotation pin 76 penetrates through the long hole 83. The anti-rotation pin 76 slides in the long hole 83.

The rotation of the plunger 8 relative to the holder 7 is restricted, and the plunger 8 can move in the axial direction.

As shown in FIG. 4, the cam pin 84 extends along the radial direction and is arranged on the rod 42. The cam pin 84 may be fixed to the rod 42. The cam pin 84 penetrates through the rotation hole 77 and the cam groove 85. The cam pin 84 slides in the rotation hole 77 and the cam groove 85.

The operation of the deburring apparatus 10 of this embodiment will be described.

The shank 11 is installed on the spindle (not shown) of the machine tool. The housing 1 rotates together with the spindle. The rotation of the housing 1 is transmitted to the tilting shaft 4 via the transmission rod 3. The cutter 101, the holder 7, and the tilting shaft 4 rotate integrally.

As shown in FIG. 1, when the cutter 101 is not in contact with the workpiece 103 (referring to FIG. 8), the elastic force of the spring 6 makes the first flange portion 51 abut against the second flange portion 41 and exert forces on the second flange portion 41. The tilting axis 43 and the shank-axis 15 are aligned.

Figure 8:
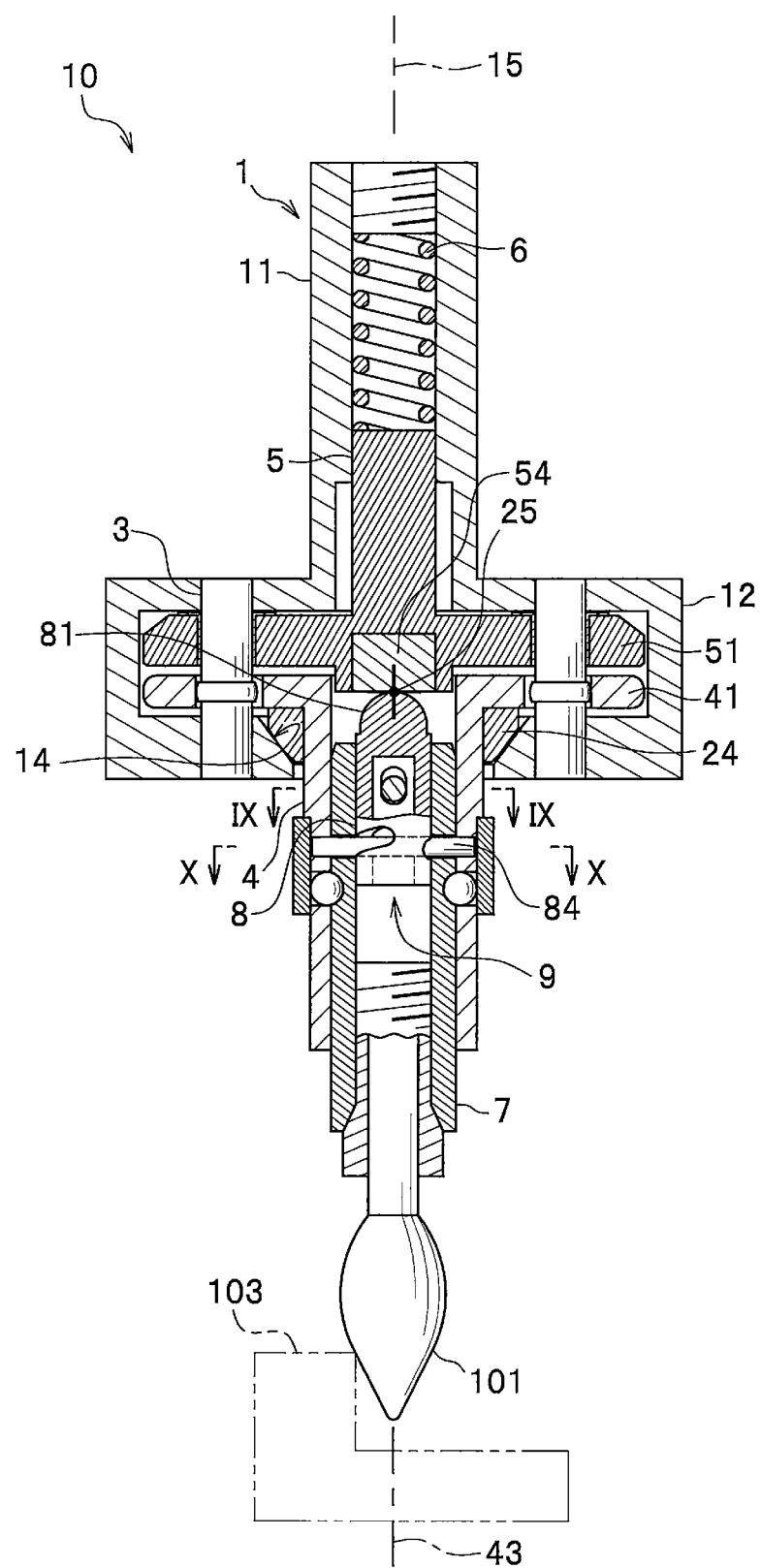
FIG. 8 shows a longitudinal cross-sectional view of the deburring apparatus during processing according to Embodiment 1 of the present disclosure.
Figure 9:
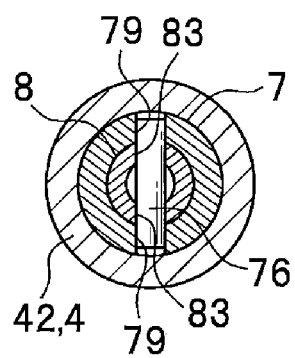
FIG. 9 shows a cross-sectional view taken along line IX-IX in FIG. 8.
Figure 10:
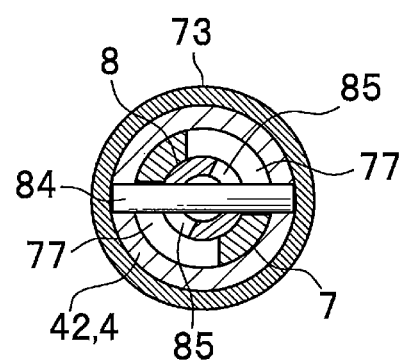
FIG. 10 shows a cross-sectional view taken along line X-X in FIG. 8.

The machine tool makes the deburring apparatus 10 move while rotating. The cutter 101 is in contact with the workpiece 103. Then, the cutter 101 receives cutting resistance, and the holder 7 rotates relative to the tilting shaft 4 in a direction opposite to the rotation direction of the deburring apparatus 10. As shown in FIGS. 8 to 10, the plunger 8 is moved toward the proximal end direction by the rotary-to-rectilinear motion conversion mechanism 9. The plunger 8 pushes the recovery rod 5 upward toward the proximal end direction. The first flange portion 51 is separated from the second flange portion 41. The top portion 81 abuts against the contact portion 54 on the tilting axis 43 in a state where the tilting axis 43 and the shank-axis 15 are aligned. The tilting shaft 4 is in a state capable of tilting.

When the holder 7 rotates by the rotation angle φ relative to the tilting shaft 4, the plunger 8 moves to the end of the proximal end direction. The contact position of the top portion 81 and the contact portion 54 is near the tilting center 25.

Figure 11:
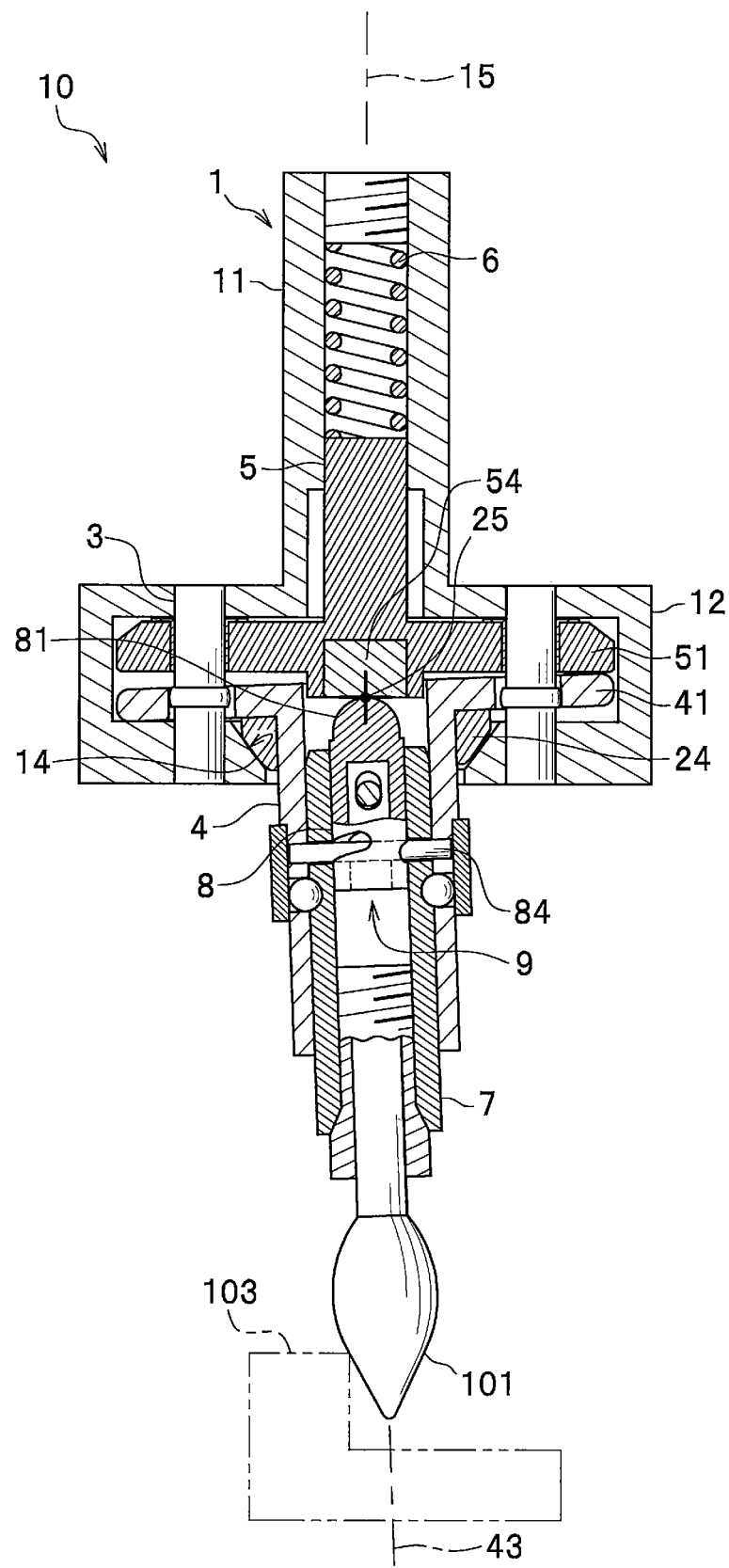
FIG. 11 shows a longitudinal cross-sectional view of the deburring tool in a state where the tilting shaft is inclined.

With the movement of the spindle, the cutter 101 cuts the workpiece 103 while moving along the ridgeline of the workpiece 103. At this time, by the elastic force of the spring 6, the recovery rod 5 forces the tilting shaft 4 toward the distal end direction via the plunger 8 and the cam pin 84. The spherical bush 24 is kept in a state of being supported in a manner of sliding on the seat surface 14, and the tilting shaft 4 can tilt around the tilting center 25 (referring to FIG. 11).

When the cutter 101 moves away from the workpiece 103 again, the cutter 101 does not receive cutting resistance. Then the recovery rod 5 pushes down the plunger 8 toward the distal end direction by the elastic force of the spring 6. The recovery rod 5 moves smoothly in such a manner that the stem 52 is guided by the bush 53 and the guide hole 51a is guided by the shaft portion 33. As the plunger 8 moves toward the distal end direction, the holder 7 rotates relative to the tilting shaft 4 in the rotation direction of the cutter 101. The first flange portion 51 abuts against the second flange portion 41. With the movement toward the distal end direction of the recovery rod 5, the inclination of the tilting axis 43 relative to the shank-axis 15 decreases. The recovery rod 5 and the plunger 8 reach the end in the distal end direction. The tilting axis 43 is aligned with the shank-axis 15.

Embodiment 2

Figure 12:
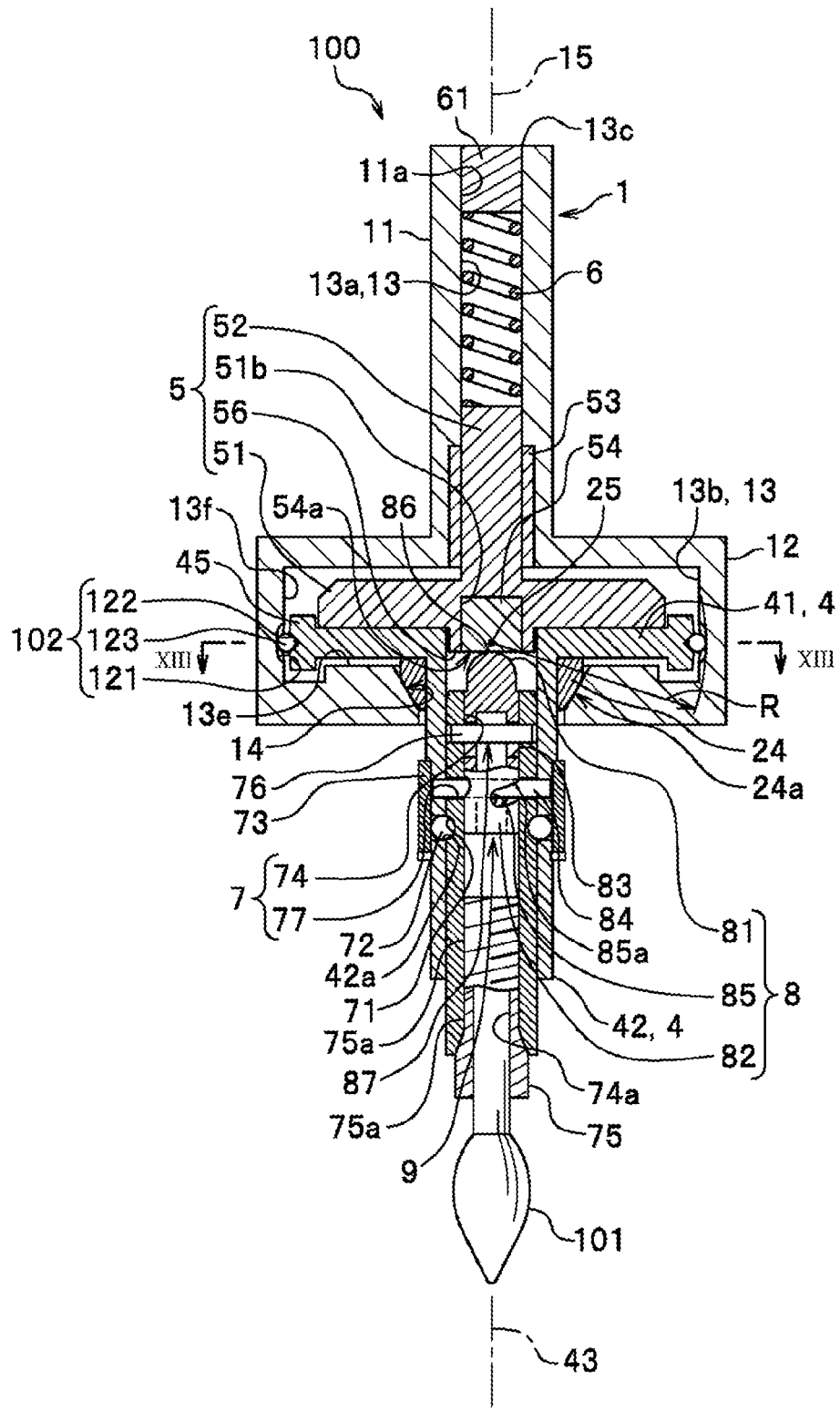
FIG. 12 shows a longitudinal cross-sectional view of a deburring apparatus during non-processing according to Embodiment 2 of the present disclosure.
Figure 13:
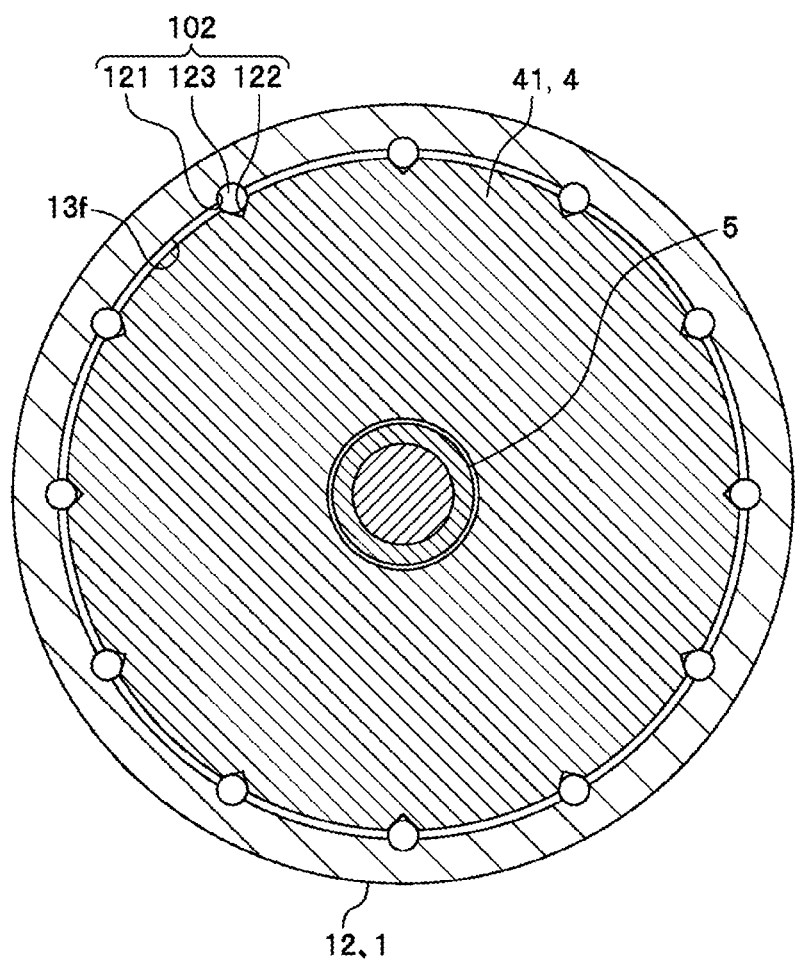
FIG. 13 shows a cross-sectional view taken along line XIII-XIII in FIG. 12.

Referring to FIGS. 12 and 13, the deburring apparatus 100 of this embodiment includes a rotation transmission mechanism 102 instead of the rotation transmission mechanism 30 shown in FIGS. 1 and 2. The rotation transmission mechanism 102 includes a set of rolling grooves 121, a set of ball holding holes 122, and a ball 123.

The rolling grooves 121 are arranged on the cylindrical inner peripheral surface 13f of the mechanism chamber 13. The rolling grooves 121 are arranged on a plane passing through the shank-axis 15. Specifically, the rolling grooves 121 extend up and down at the intersection of a plane passing through the shank-axis 15 and a spherical surface with a radius of R centered at the tilting center 25. The cross section of the rolling grooves 121 has a semicircular shape. Here, the cross section refers to a cross section perpendicular to the direction in which the rolling grooves 121 extend. The rolling grooves 121 are evenly distributed on the circumference around the shank-axis 15.

The ball holding hole 122 has, for example, a straight cone shape. The ball holding holes 122 are arranged on the outer peripheral portion 45 on a plane passing through the tilting center 25 and perpendicular to the tilting axis 43 to be evenly distributed on the circumference. The number of ball holding holes 122 is the same as the number of rolling grooves 121.

The ball 123 is arranged between each ball holding hole 122 and the rolling groove 121. The ball 123 is held in the ball holding hole 122 and rolls in the rolling groove 121.

The rotation of the housing 1 is transmitted to the tilting shaft 4 via the rolling groove 121, the ball 123, and the ball holding hole 122. In other words, the ball 123 restricts the relative rotation between the rolling groove 121 and the ball holding hole 122 around the shank-axis 15 and transmits the rotation of the housing 1 to the tilting shaft 4.

In addition, the rolling groove 121 may be arranged on the outer peripheral portion 45 of the second flange portion 41, and the ball holding hole 122 may be arranged on the cylindrical inner peripheral surface 13f of the mechanism chamber 13. In this case, the rolling grooves 121 are evenly arranged on a plane passing through the tilting axis 43 on the outer peripheral portion 45 of the second flange portion 41 around the tilting axis 43. The ball holding holes 122 are evenly arranged on a plane perpendicular to the shank-axis 15 around the shank-axis 15 on the cylindrical inner peripheral surface 13f of the mechanism chamber 13.

Embodiment 3

Figure 14:
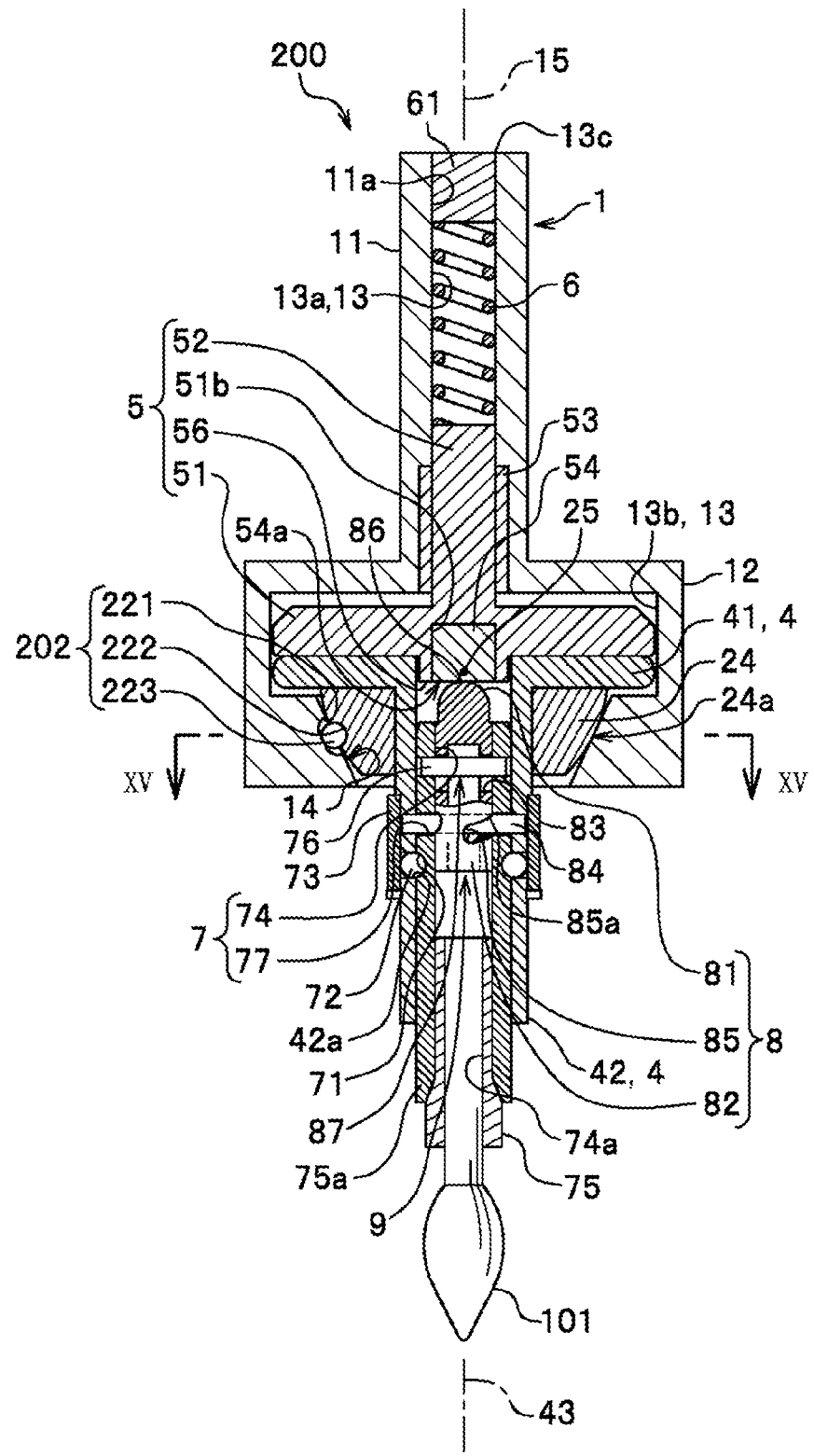
FIG. 14 shows a longitudinal cross-sectional view of a deburring apparatus during non-processing according to Embodiment 3 of the present disclosure.
Figure 15:
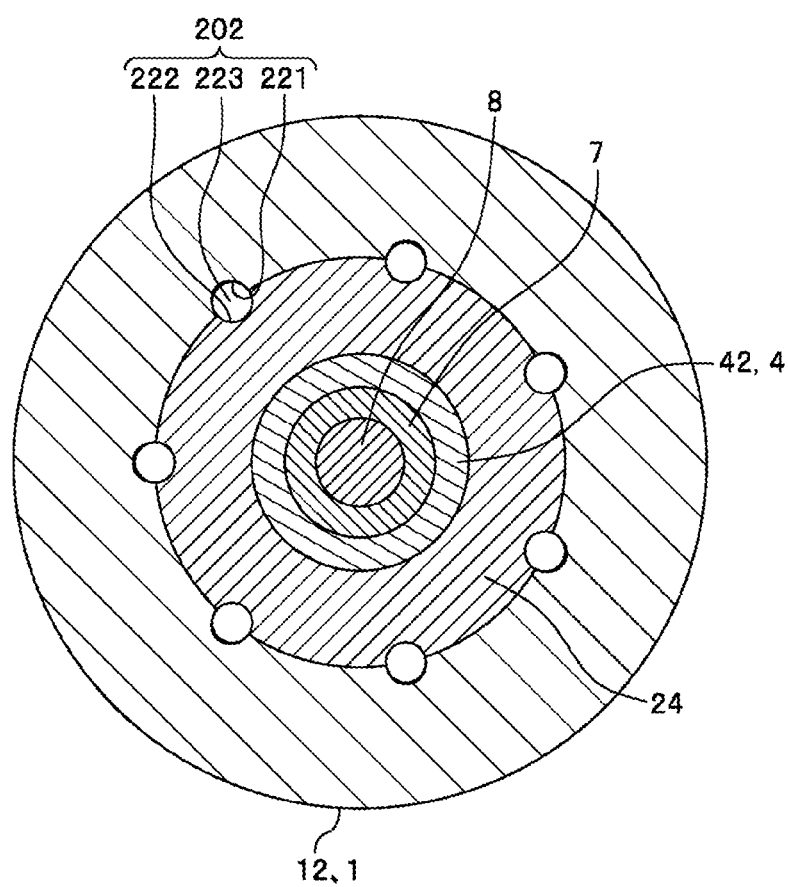
FIG. 15 shows a cross-sectional view taken along line XV-XV in FIG. 14.

Referring to FIGS. 14 and 15, the deburring apparatus 200 of this embodiment includes a rotation transmission mechanism 202 instead of the rotation transmission mechanism 30 shown in FIGS. 1 and 2. The other structure of the deburring apparatus 200 is the same as that of the deburring apparatus 100.

The rotation transmission mechanism 202 includes a set of rolling grooves 221, a set of ball holding holes 222, and a ball 223.

The rolling grooves 221 are arranged on the seat surface 14. The rolling grooves 221 are arranged on a plane passing through the shank-axis 15. Specifically, the rolling grooves 221 extend up and down at the intersection of a plane passing through the shank-axis 15 and a spherical surface centered at the tilting center 25. The cross section of the rolling grooves 221 has a semicircular shape. Here, the cross section refers to a cross section perpendicular to the direction in which the rolling grooves 221 extend. The rolling grooves 221 are evenly distributed on the circumference around the shank-axis 15.

The ball holding hole 222 is, for example, a hemispherical recess. The ball holding holes 222 are arranged on the spherical surface 24a of the spherical bush 24 in a plane perpendicular to the tilting axis 43 to be evenly distributed on the circumference. The number of ball holding holes 222 is the same as the number of rolling grooves 221.

The ball 223 is arranged between each ball holding hole 222 and the rolling groove 221. The ball 223 is held in the ball holding hole 222 and rolls in the rolling groove 221.

The rotation of the housing 1 is transmitted to the tilting shaft 4 via the rolling groove 221, the ball 223, and the ball holding hole 222.

In addition, the rolling groove 221 may be arranged on the spherical surface 24a of the spherical bush 24, and the ball holding hole 222 may be arranged on the seat surface 14. In this case, the rolling grooves 221 are evenly arranged on a plane passing through the tilting axis 43 around the tilting axis 43 on the spherical bush 24. The ball holding holes 222 are evenly arranged on a plane perpendicular to the shank-axis 15 around the shank-axis 15 on the seat surface 14.

In addition, the present disclosure is not limited to the aforementioned embodiments, and various modifications can be made without departing from the principle of the present disclosure. All technical matters included in the technical idea described in the claims are the objects of the present disclosure. The above-mentioned embodiments show preferred examples, but those skilled in the art can implement various alternatives, modifications, variants, or improvements based on the content disclosed in this specification, they are all within the technical scope described in the claims.

What is claimed is:

1. A deburring apparatus, comprising:
   a housing which includes a shank, a seat surface, and a mechanism chamber arranged along a shank-axis;
   a recovery rod including a first flange portion, the recovery rod being reciprocable along the shank-axis;
   a tilting shaft including a second flange portion opposite to the first flange portion and a spherical bush supported on the seat surface, the spherical bush having a tilting center on the shank-axis, the tilting shaft being arranged along a tilting axis passing through the tilting center and tiltable around the tilting center;
   an elastic member which forces the recovery rod toward the tilting shaft;
   a holder arranged on the tilting shaft in a manner rotatable through a predetermined rotation angle relative to the tilting shaft, the holder fixing a cutter;
   a rotary-to-rectilinear motion conversion mechanism including a plunger movable along the tilting axis on the holder, the rotary-to-rectilinear motion conversion mechanism separating the first flange portion from the second flange portion and bringing the plunger into contact with the recovery rod on the tilting axis when the holder rotates in a direction opposite to a rotation direction of the shank; and
   a rotation transmission mechanism which transmits a rotation of the housing to the tilting shaft.

2. The deburring apparatus according to claim 1, wherein the rotary-to-rectilinear motion conversion mechanism brings the plunger into contact with the recovery rod at the tilting center when the holder has rotated through the rotation angle in the direction opposite to the rotation direction of the shank.

3. The deburring apparatus according to claim 2, wherein the rotary-to-rectilinear motion conversion mechanism includes:
   an anti-rotation mechanism which restricts a rotation of the plunger relative to the holder;
   a cam groove spirally shaped in the plunger; and
   a cam pin arranged in the tilting shaft in a manner of penetrating through the tilting shaft and the cam groove perpendicularly to the tilting axis, the cam pin sliding in the cam groove.

4. The deburring apparatus according to claim 3, wherein the anti-rotation mechanism includes:
   a long hole extending along an axial direction of the plunger in a manner of penetrating through the plunger in a radial direction; and
   an anti-rotation pin which penetrates through the long hole and is arranged in the holder in a manner of extending in the radial direction.

5. The deburring apparatus according to claim 1, wherein the rotary-to-rectilinear motion conversion mechanism includes:
   an anti-rotation mechanism which restricts a rotation of the plunger relative to the holder;
   a cam groove spirally shaped in the plunger; and
   a cam pin arranged in the tilting shaft in a manner of penetrating through the tilting shaft and the cam groove perpendicularly to the tilting axis, the cam pin sliding in the cam groove.

6. The deburring apparatus according to claim 5, wherein the anti-rotation mechanism includes:
   a long hole extending along an axial direction of the plunger in a manner of penetrating through the plunger in a radial direction; and
   an anti-rotation pin which penetrates through the long hole and is arranged in the holder in a manner of extending in the radial direction.

7. The deburring apparatus according to claim 1, wherein the rotation transmission mechanism includes:
   a receiving portion arranged in the second flange portion and penetrated by transmission rods respectively; and
   a plurality of the transmission rods arranged around the shank-axis in parallel with the shank-axis and fixed to the mechanism chamber.

8. The deburring apparatus according to claim 7, wherein each of the plurality of transmission rods includes a bulge portion arranged on a plane perpendicular to the shank-axis and passing through the tilting center; and the receiving portion includes an abutting surface that abuts against the bulge portion.

9. The deburring apparatus according to claim 7, wherein the recovery rod includes a plurality of guide holes arranged in the first flange portion and penetrated respectively by the plurality of transmission rods, and the recovery rod is guided in a manner of sliding along the plurality of transmission rods in the plurality of guide holes.

10. The deburring apparatus according to claim 7, wherein the recovery rod is guided by the plurality of transmission rods inserted in the plurality of guide holes formed in the first flange portion and the housing, and moves in the shank-axis direction.

11. The deburring apparatus according to claim 1, wherein the rotation transmission mechanism includes:
   a rolling groove which is arranged on one of the seat surface and the spherical bush, and is evenly arranged around the shank-axis on a plane passing through the shank-axis;
   a plurality of ball holding holes which are arranged on the other of the seat surface and the spherical bush, and are evenly arranged around the tilting axis on a plane passing through the tilting axis; and a ball which is held between the rolling groove and the ball holding hole and rolls between the rolling groove and the ball holding hole.

12. The deburring apparatus according to claim 1, wherein the rotation transmission mechanism includes:
  a rolling groove which is arranged on a spherical surface centered at the tilting center, and is evenly arranged around the shank-axis on a plane passing through the shank-axis;
  a ball holding hole which is arranged at an outer peripheral portion of the second flange portion, and is arranged on a plane passing through the tilting center and perpendicular to the shank-axis; and
  a ball which is held between the rolling groove and the ball holding hole and rolls between the rolling groove and the ball holding hole.

* * * * *